United States Patent
Ziegler

(10) Patent No.: US 6,591,512 B2
(45) Date of Patent: Jul. 15, 2003

(54) DEVICE FOR USE AS A NAVIGATION LINK WHEN MEASURING OBJECTS

(75) Inventor: Marcus Ziegler, München (DE)

(73) Assignee: DaimlerChrysler (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/601,525
(22) PCT Filed: Jan. 27, 1999
(86) PCT No.: PCT/DE99/00195
§ 371 (c)(1), (2), (4) Date: Aug. 2, 2000
(87) PCT Pub. No.: WO99/39158
PCT Pub. Date: Aug. 5, 1999

(65) Prior Publication Data
US 2003/0079360 A1 May 1, 2003

(30) Foreign Application Priority Data
Feb. 2, 1998 (DE) .......................... 198 03 942

(51) Int. Cl.[7] .................................. G01B 3/14
(52) U.S. Cl. .......................... 33/562; 33/502
(58) Field of Search ................ 33/556, 559, 561, 33/562, 502, 644, 503

(56) References Cited

U.S. PATENT DOCUMENTS

| | | | | |
|---|---|---|---|---|
| 4,932,136 A | * | 6/1990 | Schmitz et al. | 33/502 |
| 5,107,599 A | * | 4/1992 | Marincic et al. | 33/527 |
| 5,396,714 A | * | 3/1995 | Sturges, Jr. et al. | 33/644 |
| 5,832,619 A | * | 11/1998 | Volkema, Jr. | 33/527 |
| 5,909,939 A | * | 6/1999 | Fugmann | 33/559 |
| 6,023,850 A | * | 2/2000 | Trapet | 33/502 |
| 6,286,225 B1 | * | 9/2001 | Schimmels et al. | 33/559 |

FOREIGN PATENT DOCUMENTS

| | | |
|---|---|---|
| DE | 296 18 726 U! | 2/1997 |
| DE | 195 36 294 A | 4/1997 |
| DE | 297 08 830 U1 | 7/1997 |
| WO | WO 92/03706 A | 3/1991 |
| WO | WO 95/20747 A | 8/1995 |

OTHER PUBLICATIONS

R. Malz: "Ein neues optisches 3D–Messverfahren fur Reverse Engineering"; pp. 41–1–14–8, XP002106505; Buchs, Schweiz (Date uncertain).

* cited by examiner

Primary Examiner—G. Bradley Bennett
(74) Attorney, Agent, or Firm—Pendorf & Cutliff

(57) ABSTRACT

So-called navigation links or navigation references are required in the area of optical three dimensional coordinate measuring techniques in order to be able to compile measured data of expanded objects from individual partial measurements in a mosaic-like manner. Conventional navigation links employ adhesive marks which require investment of time to fixing them onto and then remove them from the object to be measured, or employ structures which are difficult to transport. These disadvantages should be minimized. This is achieved by using a device as a navigation link essentially comprised of a grid-like component on which a plurality of measuring marks and a plurality of connecting elements each having a fastening device are attached.

12 Claims, 2 Drawing Sheets

DEVICE FOR USE AS A NAVIGATION LINK WHEN MEASURING OBJECTS

BACKGROUND OF THE INVENTION

1. Field of the Invention

The invention concerns a device for use as a navigational link when measuring objects.

2. Description of the Related Art

Such a navigational link is already known from R. Malz; "A new optical 3D-measurement system for reverse engineering," Minutes of the Technical Meeting "Qualitaet und Micotechnik" ("Quality and Microtechnology") 30th/31st October, 1997.

Such a navigational link is required in the areas of optical three dimensional coordinate measurements, in the inspection and position control of objects, especially automotive vehicles. Here there is the necessity, because of the limited measurement field of the available sensors, of assembling partial measurement data that was collected for parts of an extended object. To permit an exact assembling of the measurement data from the individual partial measurements in mosaic like manner, a fixed reference coordinate system of measuring points relative to the object to be measured is required over the total duration of the different sectional measurements. Typically, a location accuracy of about 10 to 50 micrometers is possible in the case of a measurement object in the order of magnitude of a few meters. For defining the reference network, so-called navigational links or networks or grids are employed, which bear the required measurement points in the form of measurement marks. The individual section views of different partial measurements can subsequently be assembled into a composite data set using the measurement points of the reference network.

According to the prior art R. Malz (discussed above) and DE 195 36 294 A1 the measurement object is often made into its own navigational link, in that most measurement marks are affixed directly onto the object to be measured, i.e. as a rule the measurement marks will be adhered to the object to be measured (see especially R. Malz, above, section 3.3, wherein the navigational link is characterized as a navigation field). Such an affixation of measurement marks and the spacing thereof is very time consuming because of the sometimes large number required and the fact that a not inconsiderable part of the outer surface of the object to be measured must be covered with the affixed measurement marks. Beyond this, the outer surface of the object to be measured is often not sufficiently flat for the measurement marks to be sufficiently accurately measured through optics. (The relevant areas of a measurement mark typically have a cross-section of between 3 and 12 millimeters and this relevant area should be fixed on an exactly flat surface.)

Additionally, it has already been suggested to use a navigational link in the form of a measurement cage for small objects. This is only useful so long as the object does not exceed a spatial volume of around 1 cubic meter or a weight of about 20 Kg. Above this limit the measurement cage will, on the one hand, be bulky, i.e. especially hard to transport, i.e. the advantage of a mobile measurement system is lost. On the other hand, because of the attempt to keep the mass of the measurement cage small, the stability and thus the required precision of the location of the measurement points suffers.

Even when the object to be measured is small enough, and therefore the above-mentioned detriments of a measurement cage can be avoided, other deficiencies arise. In the already proposed method the object to be measured is placed in the measurement cage and therefore the underside of the object is inaccessible for measurement. To complete the measurement, the object must be turned. Thereby data sets arise, that can only be assembled into a complete data set through the further use of—as a rule labor intensive—mathematical methods. Hence high losses in measurement speed and likewise losses in accuracy usually result.

SUMMARY OF THE INVENTION

The task of the present invention consists of providing an easily transportable apparatus, that permits a large number of measurement marks to be positioned at one time, that is, in their totality, stably at least over the time period over which measurement is carried out, that is, arranged respectively in a fixed spatial position relative to the object to be measured, and that is also able to be removed at once from the object to be measured, and designed in such a way as to obstruct and interfere as little as possible with measurability of the object, and also to guarantee the required stability of the reference network over the entire measurement time period.

This task is solved by using as a navigation link a device essentially comprised of a grid-like component, on one side of which a plurality of measuring marks are provided, and on the other side of which a plurality of connecting legs are provided, each connecting leg attached at one end to the grid and at the other end to a fastening device.

With respect to the inventive apparatus, the task is solved by the provision of an apparatus for use as a navigational link which in essence includes a construction component with a grid structure, upon which a plurality of measurement marks are provided, and on which a plurality of connecting legs are provided, and on the end of the legs away from the construction component respectively a mounting or attachment device is provided.

For the measurement of an object, at least one such device is mounted on or fastened to the object via the attachment device on its connecting frames such that it "hovers" over the object. The measurement of the object occurs then from several perspectives through the meshes of the grid structure of the at least one device.

A substantial advantage of such a device and its use as a navigational link exists in its simple and fast manipulability with respect to attachment and removal. Further, one or more such devices can be reused for measurements and, with respect to their arrangement on the object to be measured, can be newly recombined, while the measurement marks which are adhered to the surface to be measured according to the conventional method become mostly damaged or completely destroyed during removal and thus cannot be used again.

There is a further essential benefit of the apparatus of the invention and its use as a navigational link in regards to the number of hidden and therefore unmeasurable or not as well measurable positions on the outer surface of the object to be measured. The conventional method, which attaches measurement marks directly on the outer surface of the object to be measured, mostly needs a higher number of measurement marks and therefore a correspondingly higher number of locations will be hidden. The use of the apparatus of the invention will only cover places on which the attaching device lies on the object, which is a substantially smaller number of places than the number of conventional measurement marks required. The measurement shadow cast by the grid-like component onto the object to be measured does not affect the measurement, because it is not positionally fixed due to the measurement from several angles of view and thus can be factored out of the measurement outcome.

Essential benefits of such a device as opposed to the use of a measurement cage exist most of all in the better transportability, but also in the easy handling for the measurement of the objects and in the mostly higher stability based on the measurement field and the construction and material costs of the navigational network. These advantages grow exponentially with the size of the object to be measured.

In an advantageous embodiment of this apparatus the grid structure is constructed to be one-, two- or three-dimensional, preferably two-dimensional, and it consists of several, preferably uniform, elementary cells which have variable spatial dimensions and/or whose number are variable. The advantages of this design lies in its simple construction and at the same time higher structural stability and easier transportability. It is further possible to modify the elementary cells with respect to their dimension and number for an optimal adaptation of the device to the requirements of each object to be measured.

The grid structure is constructed as orthogonal in an embodiment of this apparatus. The advantage of this construction lies in the especially low construction expense and simultaneously higher structural stability.

In a further advantageous embodiment of this device the grid structure has a surface whose minimum dimensions are equal to the measurement marks and whose surface norms are preferably arranged to be parallel. The essential advantage of this embodiment lies in a guaranteed optimal optical measurability of the marks provided on this surface.

Further advantageous characteristics of the described device result from grid structure being realized with a lightweight construction, such that it is built out of rails as wide as the measurement marks, preferably constructed of lightweight metal, preferably aluminum, or out of structurally stable plastic, for example carbon fiber composite or that it is constructed out of a structurally stable wire mesh, on which measurement mark size flat plates, preferably variable in their positioning, are mounted.

The lightweight construction makes possible a high level of transportability, the required structural stability is guaranteed with the rails as wide as the measurement marks, and optionally the measurement mark sized flat plates that are mountable in variable positions on the wire mesh, allow an optimal adaptation of the measurement mark positioning on the grid structure with respect to the object to be measured.

Further advantageous characteristics of the described device are comprised in that it contains exactly three connecting legs, which, preferably are provided maximally spaced apart from each other, and preferably are positioned a maximum radial distance from the center point of the grid structure mounted to the grid structure on the side of the grid structure opposite to the measurement marks.

A three-point attachment of the grid structure connection legs to the object to be measured is optimal with respect to stability and freedom from stress. The greatest possible distancing of the connecting legs from each other and from the center point of the grid further increases stability.

Further advantageous features of the described apparatus include that the connecting legs are comprised in each case of a device for the adjustment and fixing of the spatial orientation relative to the grid structure and a device for the adjustment and fixing of the length.

The advantage of this feature is comprised therein, that via the adjustment device the spatial orientation of the device and thereby the spatial orientation of the thereon situated measurement marks can be optimally adjusted for the respective measurement task, that is, adapted to the object to be measured. By means of the fixing device the established position of the measurement marks will be maintained over the measurement time frame.

An especially advantageous further refinement of the described apparatus is to have the device for the adjusting and fixing of the spatial orientation of a connecting leg relative to the grid structure constructed in the form of an arrestable ball and socket joint, and/or that the device for the adjustment and fixing of the length of a connecting leg is constructed in the form of rods slidable against each other and latchable to each other, or telescoping and latchable tubes.

The advantage of this refinement consists in that use is made of commonly available construction components which in a known manner demonstrate the required functionality and simultaneously low failure or wearing while taking up little space demand and having low weight.

A further advantageous refinement of the described apparatus consists in having the attaching device connected to each connection leg via a device for the adjustment and fixing of its spatial orientation, preferably through a fixable ball and socket joint.

The advantage of this development consists in that the positioning of the device in this way relative to the object to be measured is widely independent of the slope of the outer surface at the desired attachment point of the object.

A further advantageous feature of the described apparatus consists of the construction of the attachment device on each connection leg in the form of a suction cup or a magnetic, electrostatic or adhesive attachment device or in the form of a mechanical attachment device, preferably in the from of a clamp, plug or screw connector. The advantage of this development consists in that the device can be attached in a simple way to the object to be measured and the object can also be released without damaging it.

An especially advantageous use of the apparatus for the measuring of objects involves making several partial measurements of an object using a navigational link and assembling the partial measurements into a complete data set, when as a navigational link one or more of the precedingly described devices are used in such a manner, that one device is used as a navigational link, when the object to be measured is smaller than or has the same dimensions as the device, and that several devices are used as navigational links, when the dimensions of the object to be measured is a multiple of the dimensions of the device.

The advantage of such methods consists therein, that standard routines can continue to be employed for the optical measurement of the object to be measured and for automated assembly of the data sets from the different partial measurements—as they are employed, for example, in the case of the direct attachment of measurement marks to the object—with the use of the device as a navigational link, thus neither giving rise to new programming requirements nor training requirements for the operational personal. Simultaneously there exist the already discussed advantages in comparison to procedures, in which conventional navigational links are used.

A further beneficial embodiment of this method consists in the use of the precedingly described device in a three dimensional grid structure in the form of a measurement cage as a navigational link wherein the object to be measured is fixed in the interior of the navigational link by means of the connection legs, in the case that the object to be measured does not exceed a spatial dimension of about 1 cubic meter.

The benefit of such an embodiment also consists therein that—in contrast to known uses of a conventional measurement cage—the underside of the object remains accessible for measurement and no repositioning of the object is necessary for the complete measurement. The navigational link remains, because of the size limitation, easily transportable and structurally stable.

BRIEF DESCRIPTION OF THE DRAWINGS

Two illustrative embodiments of the apparatus of the invention are described in greater detail below through the use of FIGS. 1 through 4. The figures show.

DETAILED DESCRIPTION OF THE INVENTION

Figure 1:
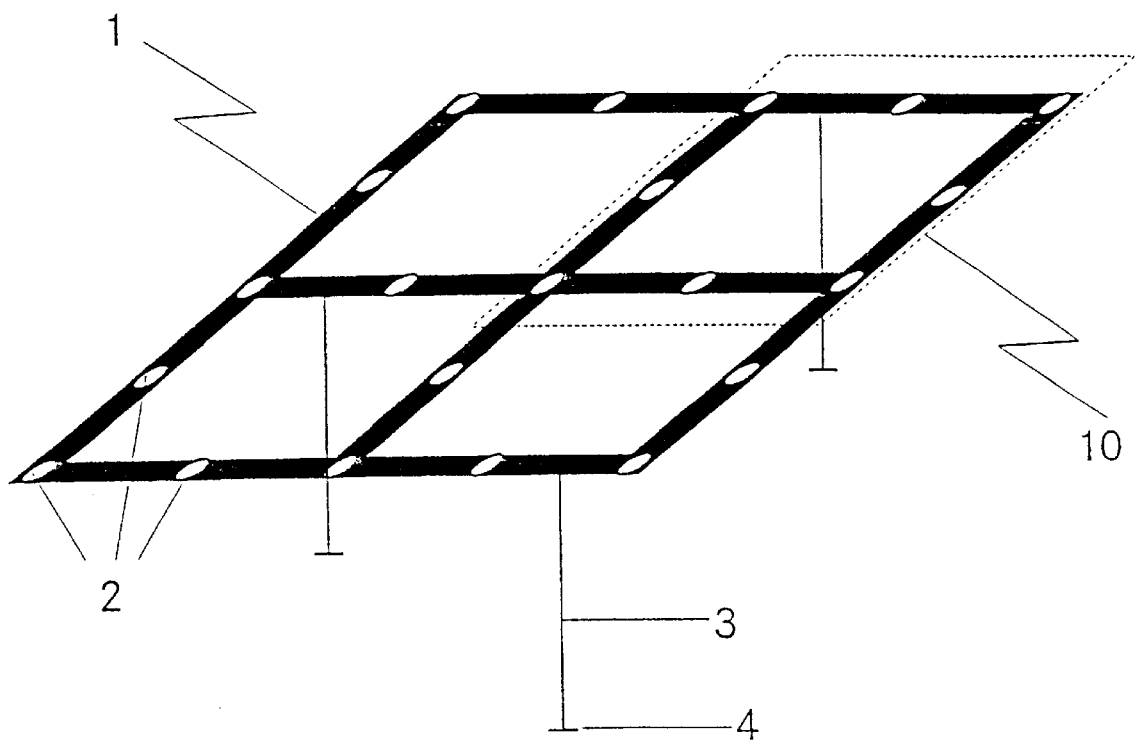
FIG. 1 a first preferred embodiment of the device of the invention with two dimensional grid structure.

FIG. 1 illustrates schematically and not to scale an apparatus for use as a navigational link, consisting of a component 1 with two dimensional grid structure, on which a plurality of measurement marks 2 are provided, and thereon several connection legs 3 are fixed, on them the component 1 is fitted on the opposite side with an attachment device 4.

Figure 2:
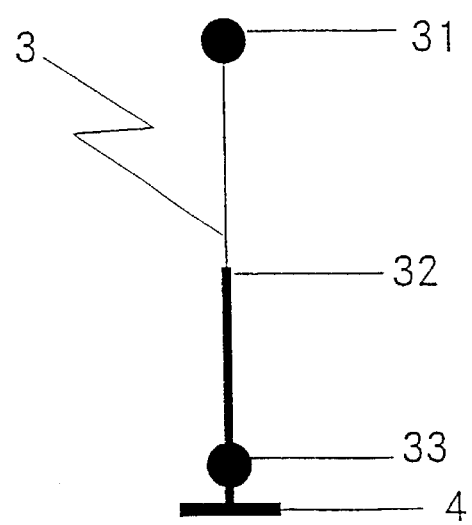
FIG. 2 a constructive detail of the apparatus according to FIG. 1.

FIG. 2 illustrates schematically and not to scale a connection leg 3, comprising a device for the positioning and fixing of its spatial orientation relative to the grid structure 31 (shown here in the form of a latching ball and socket joint) and a device for the positioning and fixing of its length 32 (shown here in the form of rods moveable and latchable with respect to each other) as well as an attaching device 4, which is attached to the connection leg 3 via a device for the positioning and fixing of its spatial orientation 33 (here-shown in the form of a latchable ball and socket joint).

The grid structure of the component 1 is two dimensional and is constructed with four uniform elementary cells in such a manner that it takes the form of a square. An elementary cell 10 is constructed to be right angled, here quadratic, and for this reason the grid structure of the component 1 is also constructed squarely. In this exemplary embodiment the component has a grid structure with an edge length of 60 centimeters.

The grid structure of the component 1 is constructed in lightweight manner (here out of aluminum) using rails that have a width equal to the measurement marks. (The rail width in this exemplary embodiment is 2 centimeter). The rails have a flat outer surface over their entire length and permit a high variability of the positioning of measurement marks 2. The rails are arranged so that their surface norms are parallel.

On the component 1, on the side of the grid structure opposite to the side with the affixed measurement marks 2, there are provided three connecting legs 3. Each connecting leg 3 includes, on the end away from the grid, a device for the positioning and fixing of its spatial orientation relative to the grid structure 31 (shown in FIG. 2 in the form of a latchable ball and socket joint), next comes a device for the adjustment and fixing of its length 32 (shown in FIG. 2 in the form of rods slidable and latchable with respect to each other). On the side away from component 1 each connection leg 3 has an attaching device 4, which is connected with the connection leg 3 via a device for the positioning and fixing of its spatial orientation 33 (here shown in the form of a latchable ball and socket joint). The attaching device 4 is in this illustrative embodiment is constructed in the form of a magnetic holding device.

The apparatus of the invention proves itself in the design of the above described example as especially convenient for the optical, three dimensional coordinate measurement technology, for the inspection and position control of the objects, especially automotive vehicles. For this several devices are secured onto the object and serve as navigational links for its measurement. The measurement itself and also the computational method for the assembly of the measurement data from the different partial measurements of the object do not differ from the conventional method, wherein the object itself with measurement marks attached serves as the navigational link. With objects that have dimensions similar to the device, the use of a single device as the navigational link is sufficient.

Figure 3:
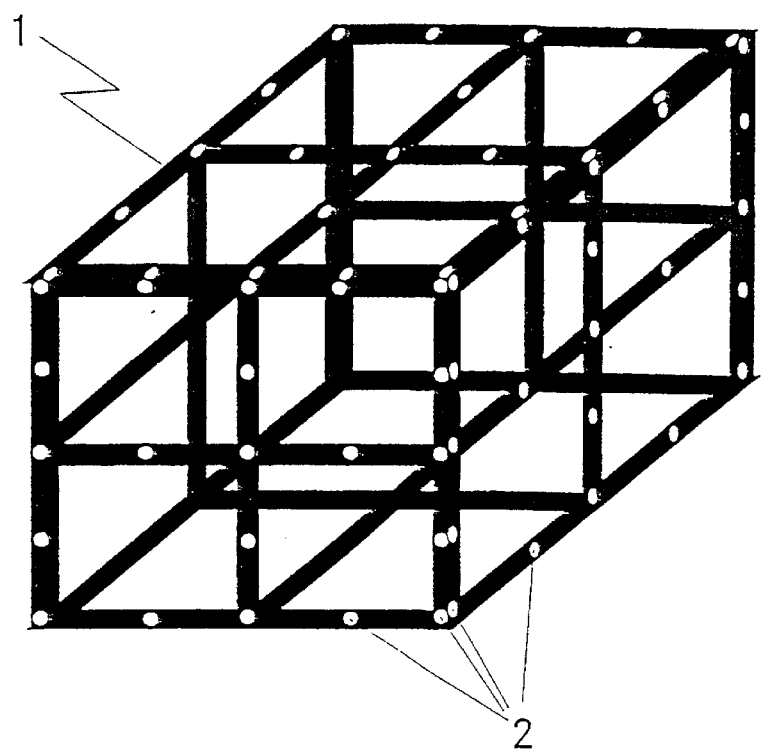
FIG. 3 a second preferred embodiment of the apparatus of the invention with a three-dimensional grid structure.

FIG. 3 illustrates schematically and not to scale a second device for use as a navigational link, consisting of component 1 with three dimensional grid structure in the form of a measurement cage, onto all sides of which, i.e. also on the underside, measurement marks 2 are provided. One side of the component can be opened for the introduction of the object to be measured.

Figure 4:
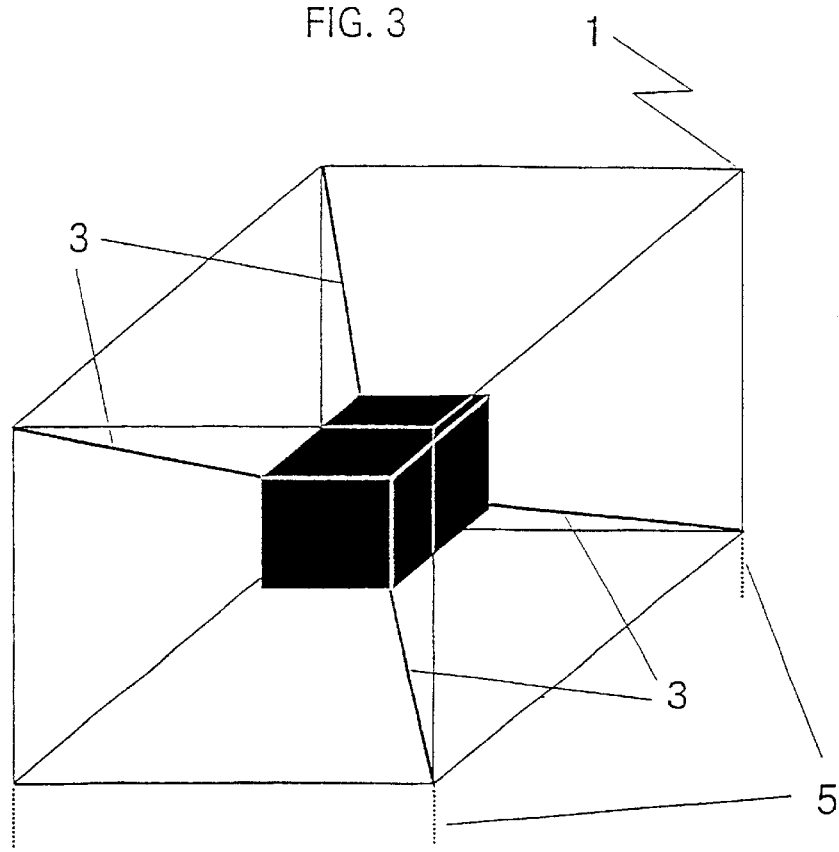
FIG. 4 Preferred arrangement of an object to be measured relative to the apparatus of FIG. 3.

FIG. 4 illustrates schematically and not to scale a preferred alignment of an object to be measured relative to the device of FIG. 3. The component 1 with three dimensional grid structure in the form of a measurement cage will only be sketched and thus is shown using thin lines. On the component 1 are mounted several connecting legs 3, and on the side of the legs opposing the component 1 an attaching device 4 is mounted. The connecting legs 3 are in this illustrative embodiment positioned on the inside, and keep and locate the object to be measured in the center of the navigational link. Thereby the underside of the object is also accessible for measurement and no repositioning of the object is necessary for the complete measurement. The accessibility can be improved through further connecting legs 5, which serve as pillars (which in FIG. 4 are shown dotted).

The apparatus according to the invention proves itself in this second design as especially suited for the optical, three-dimensional coordinate measurement technology of small objects with volumes in the order of approximately 1 cubic meter.

The invention is not restricted to only the above provided design examples, but rather is further transferable.

It is conceivable, for example, to use one or more one-dimensional grid structures instead of a two-dimensional grid structure. Such a one-dimensional grid structure could, for example, consist of one or more composite flat rails (elementary cells) that are the width of a measurement mark, onto one side of which are attached several measurement marks. This would be most useful if there is only a limited amount of available space in the area of the object to be measured, and would simultaneously further improve the transportability of the device.

Apart from that, other three-dimensional grid structures would also be conceivable, which, for example, could be in the form of a (at least open on one side) cage that encloses small parts (e.g. an exterior mirror) that stick far out from the object to be measured (e.g. a vehicle body). Such a "part" cage can be substantially smaller than the object to be measured and is therefore a simple way to design structural stability as well as transportability.

Further is it possible, that the grid structure is not constructed out of orthogonal rectangular elementary cells, but rather, for example, out of elementary cells in the form of equilateral or isosceles triangles or out of any other geometric form.

Also, the dimension of the device, especially the grid structure and the elementary cells, are not limited to the values identified in this example design. Devices with other values, fixed dimensions, as well as devices that have adjustable dimensions are conceivable. These could, for example, be built of rails slidably displaceable with respect to each other and latchable to each other.

Finally, is it conceivable that the grid structure is constructed not out of light metal, but out of another lightweight but structurally stable material, for example, out of a carbon fiber reinforced plastic. A further possibility consists in the construction out of a structurally stable wire mesh, onto which are affixed in variable positions the measurement mark sized flat plates.

Furthermore, the attachment device component of the device is preferably designed to be easily removable from the object to be measured without damaging the object to be measured. Conceivable are suction cups, magnets, electrostatic or adhesive attachment means or mechanical attachment devices that are also suitable for the device to be measured, for example in the form of a clamp, plug-in or screw attachments.

Additionally is it conceivable to provide the measurement marks not only on one side or on selected sides of the component but rather on several or on all sides. This can especially be beneficial with a three dimensional measuring component, in which the object to be measured is located on the inside, and the measurement of several spatial dimensions is made using the grid structure of the component, and also measurement marks on the inside of the component can be thereby considered.

What is claimed is:

1. A navigational link for the optical measurement of three-dimensional objects, comprising
    a framework (1) with a grid structure and having a top side and a bottom side,
    a plurality of reference marks (2) provided on at least one of said top side and said bottom side of said grid structure, and
    multiple connecting legs (3) having first and second ends, the first end attached to the other of said at least one of said top side and bottom side of said grid structure, the second end being the end away from the framework, on each of which legs (3) respectively, on the end away from the framework (1), an attaching device (4) is provided for attachment to said objects.

2. An apparatus according to claim 1, wherein
    the grid structure provides reference marks in one-, two- or three-dimensions, and
    the grid structure is constructed out of several elementary cells (10),
    whose spatial dimensions are variable,
    whose number is variable, or
    whose spatial dimensions and number are variable.

3. An apparatus according to claim 1, wherein the grid structure is constructed on the basis of squares.

4. An apparatus according to claim 1, wherein the grid structure has a flat outer surface,
    whose minimum dimensions are equal to those of the reference marks, and
    whose mark bearing surfaces are oriented parallel to each other.

5. An apparatus according to claim 1, wherein the grid structure is of lightweight construction, such that
    it is constructed out of rails that are at least the width of reference marks, and consisting of
    light metal, preferably aluminum, or
    structurally stable plastic, or that it
    is made out of a structurally stable wire mesh, on which reference-mark-sized flat plates are attached.

6. An apparatus according to claim 1, having exactly three connection legs (3), which
    are separated from each other and
    are separated from the center of gravity of the grid structure
        which legs (3) are attached to the grid structure on the side of the grid structure opposite to the side on which the reference marks (2) are provided.

7. An apparatus according to claim 1, wherein the connection legs (3) each include
    a device for the adjustment and fixing of the spatial orientation of the leg (3) relative to the grid structure (31) and
    a device for the adjustment and fixing of the length (32) of the leg.

8. An apparatus according to claim 7, wherein
    the device for the positioning and fixing of the spatial orientation of a connection leg relative to the grid structure (31) is a lockable ball and socket joint, or
    the device for the adjustment and locking of the length of a connection leg (32) is in the form of rods longitudinally displaceable with respect to each other and fixable to each other.

9. An apparatus according to claim 1, wherein the attaching device (4) on each connection leg (3)
    is attached to said leg via a device which enables the positioning and fixing of its spatial orientation (33).

10. An apparatus according to claim 1, wherein the attaching device (4) on each connecting leg (3) is selected from
    suction cups
    a magnetic, electrostatic or adhesive device, and
    a mechanical attachment device.

11. A method for the optical measurement of objects, wherein several partial measurements of an object are integrated into a combined data set by using at least one navigational link, wherein the navigational link comprises
    (a) a framework (1) with a grid structure and having a top side and a bottom side,
    (b) a plurality of reference marks (2) provided on at least one of said top said and said bottom side of said grid structure, and
    (c) multiple connecting legs (3) attached to the other of said top side and bottom side of said grid structure, on each of which legs (3) respectively, on the side away from the framework (1), an attaching device (4) is provided for attachment to said objects, and wherein the method comprises:

determining the size of the object to be measured relative to the size of the navigation link;

placing one navigational link between an optical scanner and the object, with the attaching devices (4) of the legs (3) attached to the object and with the reference marks (2) facing the optical scanner when the object to be measured has dimensions smaller than or similar to the dimensions of the navigation link, placing multiple navigational links between an optical scanner and the object, with the attaching devices (4) of the legs (3) attached to the object and with the reference marks (2) facing the optical scanner when the dimensions of the object to be measured is a multiple of the dimensions of the navigation link, scanning said object and said one or more navigation links with said at least one optical scanner to form two or more partial measurements, and combining said partial measurements to form a composite measurement.

12. A method according to claim 11, wherein a device with a three dimensional grid structure in the form of a measurement cage is used as a navigational link, and wherein the object to be measured is positioned inside of the navigational link through use of the connection legs (3) when the object to be measured does not exceed a spatial dimension of about 1 cubic meter.

* * * * *